Figure 1:
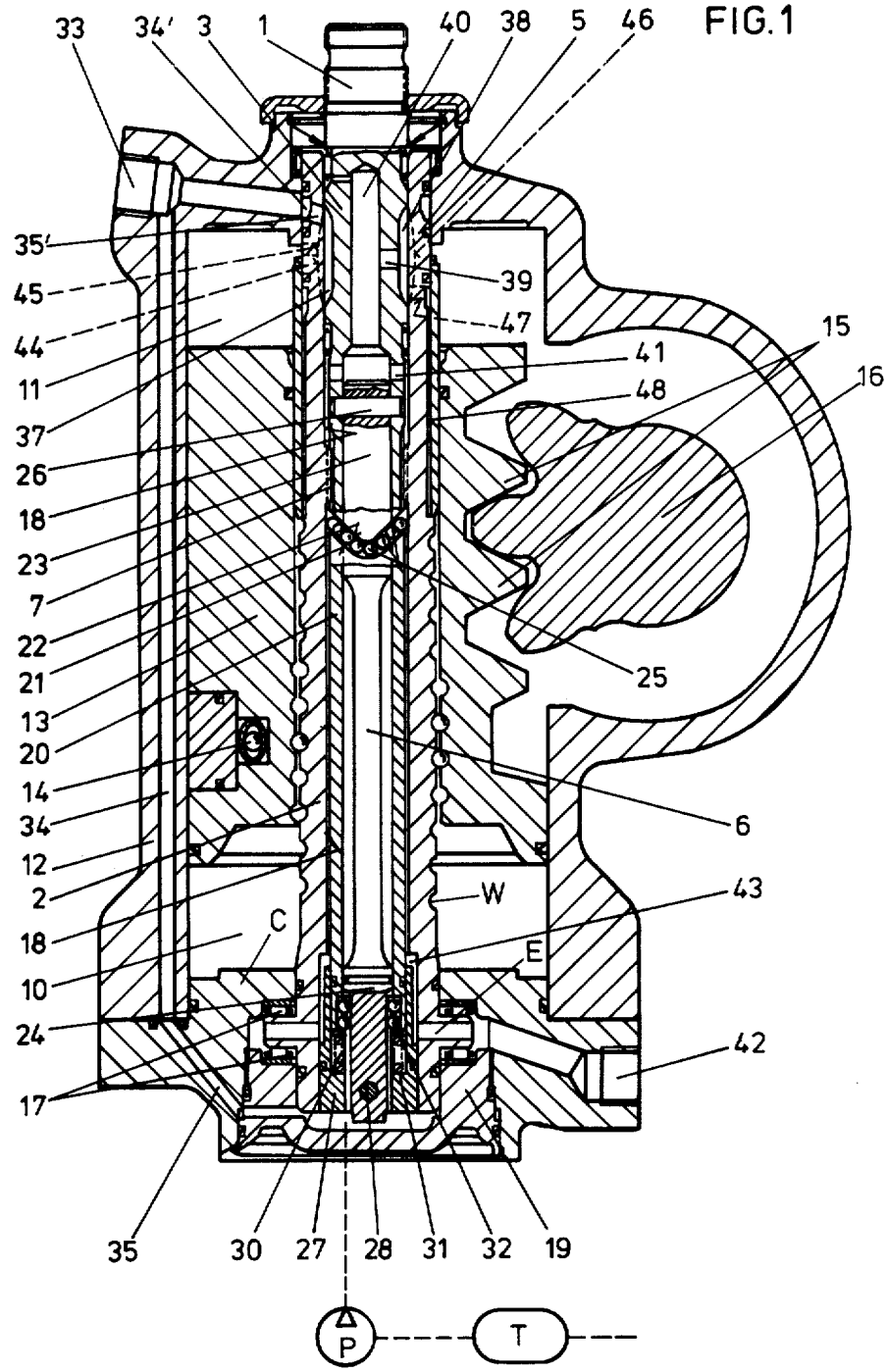

United States Patent [19]

Elser

[11] 4,373,598
[45] Feb. 15, 1983

[54] AUXILIARY STEERING FOR MOTOR VEHICLES

[75] Inventor: Dieter Elser, Essingen-Lauterburg, Fed. Rep. of Germany

[73] Assignee: Zahnradfabrik Friedrichshafen, AG, Friedrichshafen, Fed. Rep. of Germany

[21] Appl. No.: 147,602

[22] Filed: May 7, 1980

[51] Int. Cl.³ .............................................. B62D 5/08
[52] U.S. Cl. ................................ 180/143; 91/375 A; 91/434
[58] Field of Search .............. 180/143; 91/375 A, 434

[56] References Cited
U.S. PATENT DOCUMENTS 3,180,233  4/1965  Jablonsky ....................... 91/475 A
4,173,987 11/1979  Kouda .................................. 180/143

FOREIGN PATENT DOCUMENTS 1505333 11/1967 France .

Primary Examiner—John A. Pekar
Attorney, Agent, or Firm—Zalkind & Shuster

[57] ABSTRACT

A conventional power steering cylinder and valve assembly of the kind having a steering spindle and a torsion rod between relatively rotative valve members is provided with a steering resistance simulating means in the form of a tubular piston that surrounds the torsion rod and axially abuts the manually rotated portion of the steering spindle through a rotation resisting cam device. The reaction piston is axially movable but splined to the torsion rod in a manner to prevent rotation, and subjected to axial pressure force to thus resist manual rotation of the steering spindle. Manual force is exerted to act through the cam device to effect axial movement of the reaction piston against the pressure force thereon to achieve a steering resistance simulation. A particular feature resides in optional use of the reaction piston in an otherwise known cylinder and valve construction, depending on market choice.

19 Claims, 3 Drawing Figures

AUXILIARY STEERING FOR MOTOR VEHICLES

BACKGROUND OF THE INVENTION

The invention relates to an auxiliary power steering device of generally conventional construction except for the provision therein of the novel means of effecting steering resistance simulation. Various devices for effecting steering resistance simulation have been known for a long time and are shown, e.g., in U.S. Pat. No. 3,180,233 and French Pat. No. 1,505,333.

In the U.S. patent, the steering spindle is provided with a forked end which can actuate reaction pistons mounted transversely of the spindle axis in the course of a steering operation. The reaction pistons act against system pressure to resist manual force rotation of the steering spindle and thereby a simulated steering resistance or rod reaction to steering is effected. In such construction, the torsion rod is used in a conventional manner for return of relatively rotative valve elements wherein rotation of the steering spindle effects relative rotation to control pressures to and from a double acting cylinder. The reaction pistons are suitably sized and have differential piston surfaces to produce a predetermined steering resistance opposing manual rotation of the steering spindle. Constructions of that kind are relatively bulky and complex and require suitably large housings.

The French Pat. No. 1,505,333, as exemplified in FIGS. 6 and 7 therein, shows a steering spindle operated valve member which terminates in a pair of diametrically opposed notches. In each notch there is a roller trapped between the respective notch and an opposed notch carried in a member connected with the steering spindle through a torsion rod. The notches have curved sides and a series of dish springs are utilized surrounding the torsion rod to maintain resilient axial force on the rollers against the steering spindle. A hydraulic pressure force is provided by a separate piston in a chamber in the steering spindle to effect axial force of the steering spindle against the rollers. Such axial forces must be overcome by manual rotation of the steering spindle to effect road resistance. In that construction production costs are relatively high. Further, deformation and wear of the abutting elements can lead to jamming in view of the pressure forces involved.

SUMMARY OF THE INVENTION

The present invention eliminates rollers and transverse reaction pistons by providing a tubular reaction piston encompassing the torsion rod, one end of which reaction piston presses through a cam means against the inner end of the steering spindle to cause steering resistance when axial pressure force is effected on the reaction piston. The cam means comprises a V-shaped recess at that end of the reaction piston adjacent the inner end of the steering spindle which has a corresponding V-shape to fit the V-shaped recess, but with a ball bearing array inserted between the opposed parallel sloped surfaces of the V-shaped end of the steering spindle and the V-shaped recess of the reaction piston. An axial centering bias is applied to the reaction piston at the axial end thereof to which the torsion rod is rotationally coupled, remote from the valve portion of the steering spindle.

Figure 2:
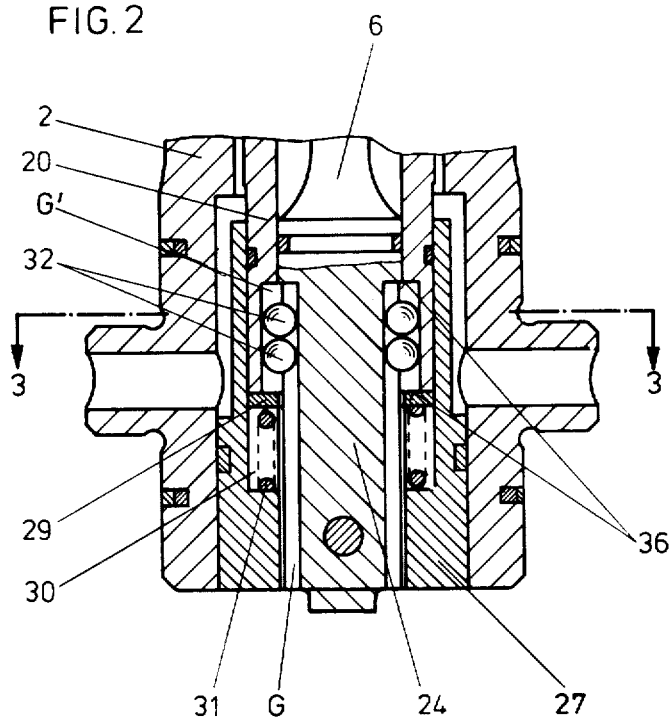
Figure 3:
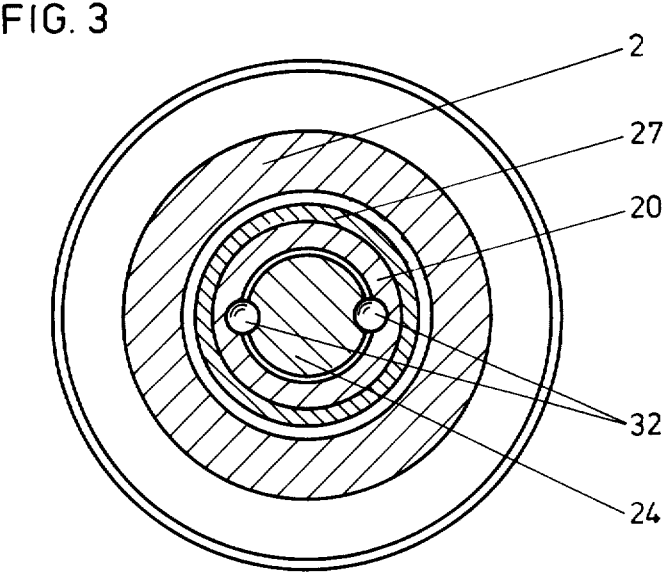

A detailed description of the invention now follows in conjunction with the appended drawing in which:

FIG. 1 is a longitudinal section showing the essential components of the power cylinder, valve assembly and reaction piston, FIG. 2 is a magnified portion of the lower end of FIG. 1 showing the arrangement of the pressure chamber for the reaction piston and the coaction with adjacent components and, FIG. 3 shows a radial section through 3—3 of FIG. 2.

Referring to the drawing, the invention comprises a housing 12 having a steering spindle assembly comprised of two sections. Thus the first section is a manually operable steering spindle 1 having an integral rotary valve plug 3 and a second valve sleeve section 2, having steering worm W and integral valve sleeve 5 which surrounds the rotary valve plug, all as conventional construction. Likewise, as conventional, various passages, grooves and bores are provided in the housing and between the rotary valve plug and the valve sleeve for purposes of system flow control. A manually operable steering wheel (not shown) is carried at the upper end of steering spindle 1.

The sections 1 and 2, i.e., the rotary valve plug 3 and valve sleeve 5, are coupled in the usual manner through a torsion rod 6 which effects return to neutral position, i.e., straight ahead steering position, of the valve members subsequent to a steering operation. Splines 7 intermediate the first and second sections have rotary play to permit relative rotation between the valve members up to a desired limit after which direct drive of the valve sleeve by steering spindle rotation occurs with no further twisting of the torsion rod.

Thus, direct drive rotation by manual force on the steering spindle of the steering worm W can be effected. During relative rotation of the rotary valve plug 3 and the valve sleeve 5, it will be understood that, depending upon direction of rotation pressure oil feeds to pressure chamber 10 or 11 of the housing. Such operation is well known and exemplified in German patent publication OS 26 37 458.

The pressure chambers 10 and 11 are separated by the power piston 13 reciprocal in the housing 12 and the steering worm having a worm screw is coupled by the ball chain 14 to coacting threading in the piston 13 whereby manual operation of the steering spindle 1 can reciprocate piston 13 so that the rack 15 on the piston can operate gear segment 16, carried in the housing, which will be understood to actuate a steering linkage mechanism in the usual manner.

The otherwise open end of the housing is closed by closure plate C through which the end of the second spindle section passes and has a radial flange with exhaust passages E. The flange is supported for axial stresses by roller bearings 17 against closure plate C and an end closure cap 19, as will be apparent from FIG. 1.

A reaction piston 20 encompasses torsion rod 6 and is axially slidable, carried on the enlarged non-torsional ends 23 and 24, of the torsion rod, all within a bore 18 of the valve sleeve section 2. Reaction piston 20, reciprocal axially, is prevented from rotation relative to torque rod 6 as will be subsequently described and is slightly spaced within bore 18 for flow passage.

A cam means or device is introduced between the upper end of reaction piston 20 and the lower end of steering spindle 1. Such cam means comprises a V-shaped recess at the end of the reaction piston and a correspondingly V-shaped adjacent end of the steering spindle. Thus, the sloping cam surfaces are formed such as 21 at the upper end of the reaction piston and 22 at the lower end of the steering spindle. Corresponding surfaces are parallel and spaced; between the surfaces an array of ball bearings 25 is provided which inherently has a V-shaped circuit. The outer race of the array is the wall of bore 18 and the inner race is the enlarged torsion rod end 23. The arrangement provides a rotational centering device for the two sections to neutral position after there has been relative rotation between the steering spindle and the reaction piston, as well as effecting rod resistance simulation, as subsequently explained.

A pin 26 locks the inner end of the steering spindle 1 to the enlarged end 23 of torsion rod 6. The opposite enlarged end 24 of the torsion rod is surrounded by a sleeve 27 radially spaced therefrom and connected thereto by a pin 28 which also connects the lower end of the torsion rod to the valve sleeve section 2. As shown, sleeve 27 is sealed between the valve sleeve section and the reaction piston.

As best seen on FIG. 2, a pressure chamber 30 is comprised within the sleeve 27 and the end of reaction chamber 20 with seals as shown. A spring 31 is carried in the pressure chamber pretensed between the bottom of the chamber and a ring 29 abutting the lower end of reaction piston 20. Spring 31 exerts a predetermined axial force acting through the reaction piston 20 and the cam device 21, 22, 25 to have a rotational centering effect to neutral position of the reaction chamber and steering spindle.

The axial reaction piston movement is facilitated by ball bearings 32 in elongated grooves intermediate the enlarged non-torsional end 24 of the torsion rod 6 and the lower end of the reaction piston 20. Thus, a set of longitudinal elongated grooves such as G are provided in the enlarged end 24 radially aligned with a set of respective complementary elongated grooves, such as G' provided in the interior wall at the end of the reaction piston 20. Alternatively, only grooves G or grooves G' need be elongated. The longitudinally arranged pairs of ball bearings thus prevent relative rotation between the torsion rod 6 and the reaction piston 20 while permitting axial motion of the reaction piston and such pairs may be provided in any desired plurality, there being a pair of longitudinal grooves G, G' for each pair of ball bearings. For example, two pair of ball bearings may suffice, diametrically opposed, but for greater radial stability three or more equiangularly spaced pairs may be used, reference being had to FIG. 3 in this regard. The use of ball bearings 32 produce an extra advantage in that they can be dimensioned to compensate for play in the assembly of the adjacent components.

The spring 31, in neutral position of the valve members, maintains the reaction piston rotationally centered with respect to the steering spindle so that the cam elements such as the sloping surfaces 21, 22 and ball bearings 25 will be maintained in the position shown in FIG. 1 as hereinbefore indicated. However, in order to provide a significant bias against which manual force must be exerted to simulate steering resistance, pressure is introduced into pressure chamber 30. Thus, an engine driven pump provides pressure oil to the inlet port 33 connecting with a longitudinal housing passage 34 and a passage 35 in the end closure plate C, to chamber 30, acting against end surfaces such as 36 of the reaction piston and exerting an axial force thereon which is transmitted to the lower end of steering spindle 1 through the cam device. Such force of relatively high pressure is in addition to that of the rotational centering spring 31.

Accordingly, upon manual rotation of steering spindle 1, it will be apparent that the cam surfaces of the lower end of the steering spindle are rotationally misaligned through the ball bearing 25 with the cam surfaces of the reaction piston and this must be accomplished by manual force against the axial pressure force, resulting in simulated steering resistance. Subsequent to the end of the steering operation when there is no more pressure in chamber 30, spring 31 will restore the rotationally centered positions of the steering spindle and the reaction piston by virtue of cam action.

Alternative means of effecting pressure in chamber 30 may be used. For example, pressure correlated with speed of travel can be produced by a pump driven by the output shaft of the vehicle gearing. This is indicated by the pump P with connection through end cap 19 and driven via power transmission T. In such case the housing passages 34 and 35 are omitted. The simulated steering resistance then increases with increasing travel speed.

In neutral position the pump connection 33 communicates with the annular groove 34' and several bores 35' in the valve sleeve 5 to axial groove 37 of the rotary valve plug 3.

Such neutral position is shown in FIG. 1 wherein pressure oil reaches the axial bore 40 in the steering spindle through axial grooves 38 in the rotary valve plug and transverse bores 39. Thereafter a pressure flow is via transverse bore 41 and through loose splines 7, which have sufficient play, into bores 18 and E in valve sleeve section 2 and ultimately into the annular channel 43 surrounding the sleeve 27, thence via exhaust port 42 to a tank (not shown). While in neutral position the oil flows through the various passages and channels without pressure and therefore reaction chamber 30 is pressureless.

Upon rotation of steering spindle 1, oil pressure passes, depending upon direction of rotation either to pressure chamber 11 via axial grooves 41 and radial bores 45 of valve sleeve 5 or to pressure chamber 10 via axial grooves 46 and radial bores 47, annular channel 48, and via the worm screw and thread spacing.

From the above, it will be apparent that any time pressure is introduced to either of the pressure chambers 10 or 11, such pressure will reach chamber 30 via the channels 34 and 35. Under some circumstances, for example, in slow moving vehicles used on building sites, additional steering resistance simulation may not be desired. In that case, the reaction piston 20 can be omitted and a torsion rod somewhat shortened at its ends inserted. Likewise, omitted would be sleeve 27, spring 31 and ball bearings 32. Accordingly, only a very slight change would be required, namely, shorter torsion rod ends although conceivably even this would not be essential.

I claim:

1. In a power steering device comprising a housing having a valved steering spindle therein comprised of two sections connected by a torsion rod (6) for return rotation to a neutral position and wherein one of the sections (1) is manually operable and carries a rotary valve plug (3) and the other of the sections (2) has a valve sleeve (5) encompassing and coacting with said rotary valve plug for flow control to and from pressure chambers (10, 11) within said housing, upon relative rotation of said sections, a piston (13) in said housing movable between said pressure chambers to activate a steering mechanism, and drive means (W, etc.) intermediate said valve sleeve section and said piston; the improvement residing in road resistance simulating means which comprises: a reaction piston (20) encompassing said torsion rod within said valve sleeve section and having an end adjacent an end of said steering spindle and rotation resisting means (21, 22, 25) comprising cam means intermediate said adjacent ends; and force means (30) acting on said reaction piston in axially spaced relation to said cam means remote from the rotary valve plug for exerting force against said steering spindle through said cam means upon rotation of said steering spindle to resist rotation thereof.

2. In a power steering device as set forth in claim 1, wherein the force means includes a spring disposed to maintain force against said reaction piston through said cam means to effect rotational centering of said steering spindle and said reaction piston in a neutral position of said rotary valve plug and said valve sleeve.

3. In a power steering device as set forth in claim 1, wherein said force means further comprises a reaction chamber and means whereby said chamber is pressurized during a steering operation, said reaction piston being responsive to pressure in said reaction chamber effecting force thereon to effect said resistance to rotation through said cam means.

4. In a power steering device as set forth in claim 1, wherein said force means comprises a spring disposed to maintain rotational centering force against said reaction piston in a neutral position of said rotary valve plug and said valve sleeve and wherein said force means also comprises a reaction chamber and means for pressurizing said chamber, said reaction piston being exposed to pressure in said reaction chamber to effect force thereon for acting on said steering spindle through said cam means to effect said resistance to rotation.

5. In a power steering device as set forth in claim 1, means providing relative rotation between said steering spindle and said reaction piston;
said cam means comprising coacting surfaces of said adjacent ends of said steering spindle and said reaction piston for transmitting axial force during relative rotation of said steering spindle and said reaction piston.

6. In a power steering device as set forth in claim 1, means providing relative rotation between said steering spindle and said reaction piston;
said cam means comprising sloped surfaces of said adjacent ends of said steering spindle and said reaction piston, said adjacent ends being V-shaped and complementary for transmitting axial force during relative rotation of said steering spindle and said reaction piston, wherein the sloped surfaces of one said end are parallel to the corresponding sloped surfaces of the other said end.

7. In a power steering device as set forth in claim 1, means providing relative rotation between said steering spindle and said reaction piston;
said cam means comprising sloped surfaces of said adjacent ends of said steering spindle and said reaction piston, said adjacent ends being V-shaped and complementary, and
a V-shaped ball bearing array intermediate said sloping surfaces between said ends.

8. In a power steering device as set forth in claim 7, said reaction piston being tubular and said torsion rod having non-torsional ends radially supporting said reaction piston, said ball bearing array surrounding an end of said torsion rod, said end effecting an inner race and the interior of said reaction piston effecting an outer race for said ball bearing array.

9. In a power steering device as set forth in claim 1, including means for permitting axial movement of said reaction piston to exert force against said steering spindle and for preventing relative rotation between said torsion rod and said reaction piston.

10. In a power steering device as set forth in claim 1, said force means comprising a pressurizable reaction chamber operative to exert a force on said reaction piston and means for pressurizing said chamber responsive to vehicle speed.

11. In a power steering device as set forth in claim 1, said force means comprising a pressurizable reaction chamber operative to exert a force on said reaction piston;
said reaction chamber communicating with the pressure inlet port of said housing and said pressure inlet port being pressureless in neutral position of said rotary valve member and said valve sleeve whereby said reaction chamber is pressureless.

12. In a power steering device as set forth in claim 1, said valve sleeve section being tubular and encompassing said adjacent ends of said steering spindle and said reaction piston.

13. In a power steering device as set forth in claim 12, said drive means comprising a worm screw on said valve sleeve section coacting with a thread in said piston through intermediate ball bearing means.

14. In a power steering device comprising a housing having a valved steering spindle therein comprised of two sections connected by a torsion rod (6) for return rotation to a neutral position and wherein one of the sections (1) is manually operable and carries a rotary valve plug (3) and the other of the sections (2) has a valve sleeve (5) encompassing and coacting with said rotary valve plug for flow control to and from pressure chambers (10, 11) within said housing, upon relative rotation of said sections, a piston (13) in said housing movable between said pressure chambers to activate a steering mechanism, and drive means (W, etc.) intermediate said valve sleeve action and said piston; the improvement residing in road resistance simulating means which comprises: a reaction piston (20) encompassing said torsion rod within said valve sleeve section and having an end adjacent an end of said steering spindle and rotation resisting means (21, 22, 25) comprising cam means intermediate said adjacent ends; and force means (30) acting on said reaction piston in axially spaced relation to said cam means remote from the rotary valve plug for exerting force against said steering spindle through said cam means upon rotation of said steering spindle to resist rotation thereof;

said valve section having a tubular end portion enclosing a reaction chamber; said reaction chamber having a portion of said torsion rod therein; sets of complementary opposed retaining grooves arrayed respectively in said reaction chamber and in said torsion rod and ball bearings retained in said grooves to maintain said reaction piston non-rotational relative to said torsion rod and to effect ease of axial motion of said reaction piston wherein at least one of said set of grooves is axially elongated.

15. In a power steering device as set forth in claim 14, said reaction chamber further comprising a sleeve within said tubular end portion sealed intermediate said tubular end portion of said valve sleeve section and said reaction piston;

a spring in said sleeve biasing said reaction piston against said steering spindle through said cam means, said cam means being shaped to maintain a rotationally centered position of said steering spindle and said reaction piston when said steering spindle is in neutral position for straight ahead steering.

16. In an auxiliary fluid power steering mechanism including a steering spindle assembly (1) formed by a manually rotatable plug valve section (3), a driving sleeve section (2) having a valve control portion (5) axially aligned with the plug valve section, a torsion rod (6) having opposite end portions (23, 24), means (26, 28) coupling said opposite end portions to the plug valve section and the sleeve section, respectively, and an operating piston (13) drivingly engaged with the sleeve section, the improvement comprising a tubular reaction piston (20) enclosing the torsion rod and connected thereto at one of the opposite end portions (24) thereof remote from the plug valve section of the spindle assembly, complementary cam surfaces (21, 22) respectively formed on the plug valve section and the tubular reaction piston at said other of the opposite end portions of the torsion rod, a plurality of ball elements (25) axially spacing the cam surfaces radially between the sleeve section and said other of the end portions of the torsion rod, and means (30, 31) for exerting an axial centering bias on the reaction piston at said one of the opposite end portions of the torsion rod to maintain the cam surfaces in parallel spaced relation.

17. The improvement as defined in claim 16, wherein the centering bias means includes pressure chamber means (30) formed on said one of the end portions of the torsion rod for exerting an axial pressure force on the reaction piston, a centering spring (31) exerting a continuous axial bias on the reaction piston, and pressure conduit means (34, 35) connected to the chamber means for selective pressurization thereof to produce said axial pressure force.

18. The improvement as defined in claim 17, including confronting grooves formed in the reaction piston and the torsion rod at said one of the end portions thereof and slide bearing balls (32) engaged in said grooves to rotationally couple the reaction piston and the torsion rod while facilitating relative axial displacement.

19. The improvement as defined in claim 16, including confronting grooves formed in the reaction piston and the torsion rod at said one of the end portions thereof and slide bearing balls (32) engaged in said grooves to rotationally couple the reaction piston and the torsion rod while facilitating relative axial displacement.

* * * * *